No. 669,673. Patented Mar. 12, 1901.
T. AVERBECK.
PIPE COUPLING.
(Application filed June 21, 1900.)
(No Model.) 3 Sheets—Sheet 1.
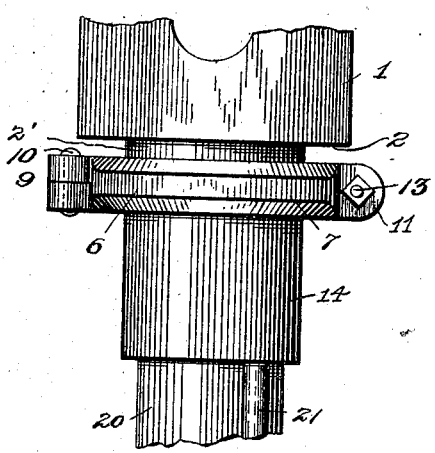
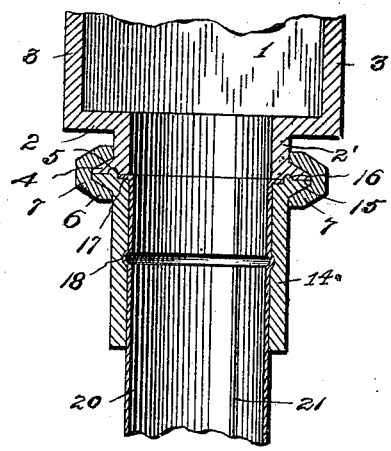
Fig. 1. Fig. 2.
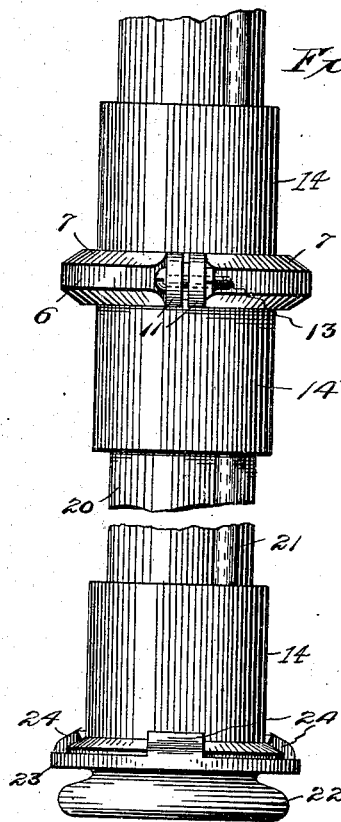
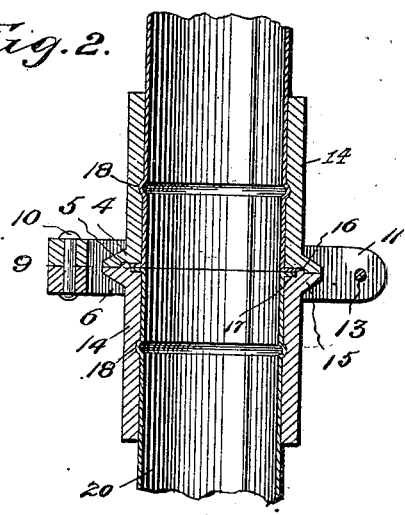
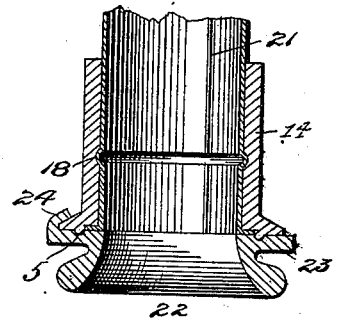
Witnesses:
E. E. Duffy
Hugh Duffy
Inventor:
Theodore Averbeck
per C. E. Duffy Atty.

No. 669,673. Patented Mar. 12, 1901.
T. AVERBECK.
PIPE COUPLING.
(Application filed June 21, 1900.)
(No Model.)
3 Sheets—Sheet 2.

Witnesses:
E. E. Duffy
C. Hugh Duffy

Inventor:
Theodore Averbeck
per O. E. Duffy
Att'y

THE NORRIS PETERS CO., PHOTO-LITHO., WASHINGTON, D. C.

No. 669,673. Patented Mar. 12, 1901.
T. AVERBECK.
PIPE COUPLING.
(Application filed June 21, 1900.)
(No Model.) 3 Sheets—Sheet 3.
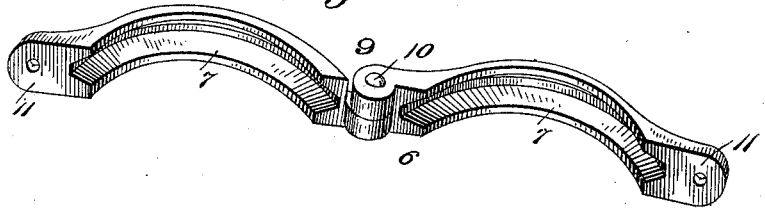
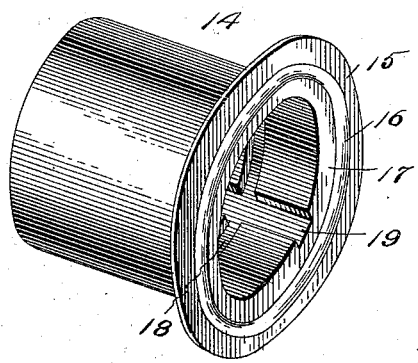
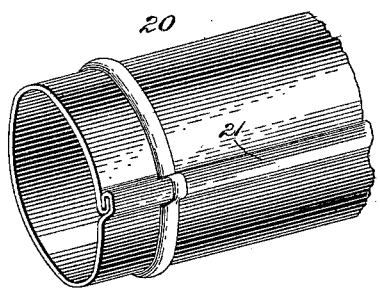
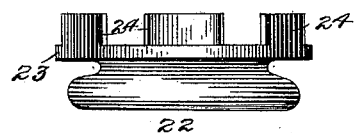
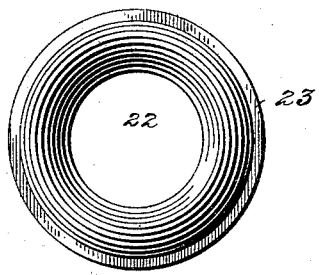
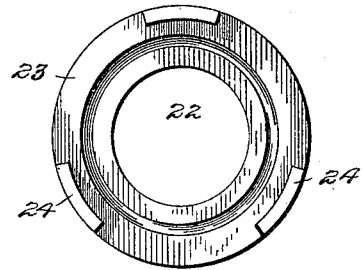
Witnesses:
E. C. Duffy
Inventor:
Theodore Averbeck
per
THE NORRIS PETERS CO., PHOTO-LITHO., WASHINGTON, D. C.

UNITED STATES PATENT OFFICE.

THEODORE AVERBECK, OF CINCINNATI, OHIO.

PIPE-COUPLING.

SPECIFICATION forming part of Letters Patent No. 669,673, dated March 12, 1901.

Application filed June 21, 1900. Serial No. 21,081. (No model.)

*To all whom it may concern:*

Be it known that I, THEODORE AVERBECK, a citizen of the United States, residing at Cincinnati, in the county of Hamilton and State of Ohio, have invented certain new and useful Improvements in Pipe-Couplings; and I do hereby declare the following to be a full, clear, and exact description of the invention, such as will enable others skilled in the art to which it appertains to make and use the same.

My invention relates to pipe-coupling, but more particularly to connections for cisterns, and has for one object to provide a coupling for galvanized-iron, tin, or brass steam or hose pipe.

A further object of my invention is to provide a pipe-coupling whereby any length of tubing can be coupled, thus obviating the necessity of having to use the tubing in regular lengths, thus allowing the same to be manufactured in but one or two lengths instead of the variety of lengths now necessary for the trade.

With these objects in view I have constructed a pipe-coupling which is simple in its construction, cheap to manufacture, easy of operation, and, above all, durable and efficient.

My invention also relates to certain other novel features of construction and combination of parts, which will be hereinafter more fully explained, and more particularly pointed out in the appended claims.

Figure 3:
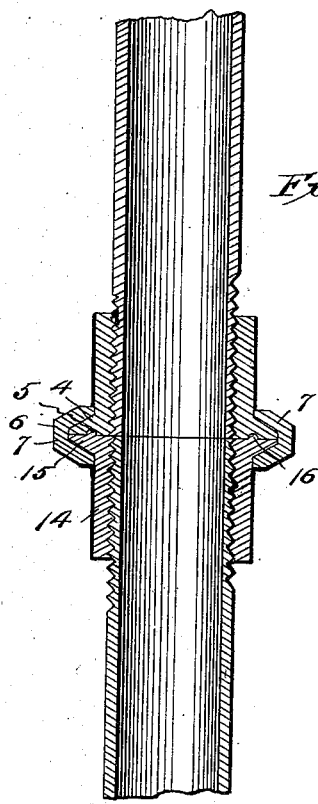
Figure 4:
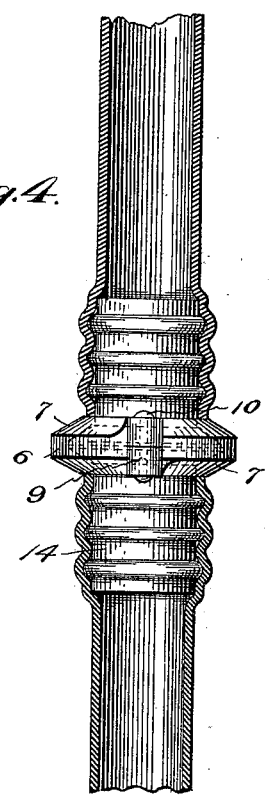
Figure 5:
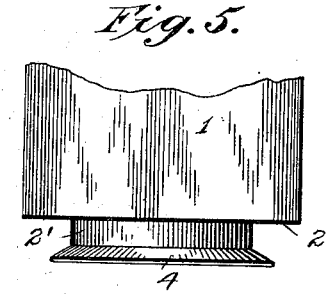
Figure 6:
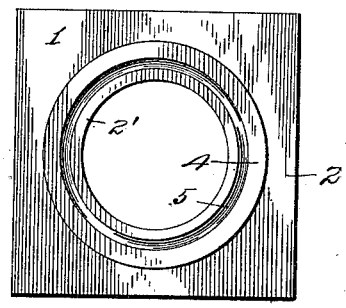

Referring to the accompanying drawings, Figure 1 is an elevation showing my invention as applied to a reservoir. Fig. 2 is a section of the same. Fig. 3 is a sectional view of a steampipe connection constructed in accordance with my invention. Fig. 4 is a sectional view of a hose-pipe, showing my connection applied. Fig. 5 is an elevation of a reservoir, showing one-half of a coupling formed integrally with the bottom thereof, the upper portion being broken away. Fig. 6 is a bottom plan view of the same. Fig. 7 is a perspective view of my improved form of coupling-ring. Fig. 8 is a perspective view of one of the coupling-sleeves. Fig. 9 is a perspective view of a piece of galvanized pipe to be used in connection with the coupling-sleeve shown in Fig. 8. Fig. 10 is a side elevation of my improved form of funnel to be used in connection with the foregoing, as shown in Figs. 1 and 2. Fig. 11 is a bottom plan of the same. Fig. 12 is a top plan of the same.

Like numerals of reference indicate the same parts throughout the several figures, in which—

1 is the reservoir, having the bottom 2 and the sides 3. Formed integrally with said bottom 2 and depending therefrom is one of the coupling members 2', having the tapering flange 4 and a circular groove 5 in the face thereof.

6 indicates my coupling-ring, constructed of two semicircular members 7, said members being hollowed out substantially in the shape of a V for a purpose which will be hereinafter more fully described, said members 7 being oppositely halved to form the hinge 9 and to hold the pin 10. Said ring members are formed with extensions 11 for the purpose of providing a bearing for the tightening bolt or pin 13.

14 is a coupling-sleeve which forms one member of the coupling and is provided with the tapering flange 15, said flange being provided on its face with a circular annular projection 16, which registers with the circular groove 5 in the flange 4 of the other coupling member. On the inside of the said annular projection 16 is an annular depression or groove 17, and at approximately the center of sleeve is an internal annular groove 18. The purpose of said grooves will be hereinafter fully described.

19 is an internal longitudinal groove extending the entire length of the coupling-sleeve. (See Fig. 8.)

20 is the galvanized pipe provided with the ordinary seam 21.

The central portions of Figs. 1 and 2 show two pieces of pipe coupled together, parts of said pipe being broken out in order to enlarge the view, and the manner of coupling is the same as in the foregoing description, except that in place of the reservoir coupling member there is a coupling-sleeve provided with the same tapering flange 4 and the circular groove 5, the rest of the sleeve being the exact duplicate of the coupling-sleeve 14.

At the bottom of the cistern-pipe I have provided an improved form of funnel, which can be attached to any length of pipe and not being made integrally therewith, as is generally the case. At the end of the pipe when it is desired to use a funnel, as ordinarily used in chain-pumps, a coupling-sleeve 14 is attached to the end of the pipe, as will be hereinafter explained. The funnel 22 is placed at the bottom of the pipe for the purpose of allowing the chain to readily enter the pipe and to relieve the friction which would be caused by the contact of the chain with the sharp edge of the pipe. Said funnel is provided with a flange 23, said flange having the circular groove 5 in the face thereof and a series of prongs 24 projecting upward from said face, at or near the circumference thereof.

Having thus described the several parts of my invention, its operation is as follows: When it is desired to use my couplings in cistern connections, I cast the coupling member 2' integrally with the bottom of reservoir, as described, the galvanized pipe 20 being made to form a snug fit with the coupling-sleeve 14 and is inserted therein, and the end of the pipe is turned over into the annular depression or groove 17, as shown in Fig. 2. This groove or depression is as deep as the thickness of the pipe, so that when said pipe is turned over into said groove the surface of said pipe will be flush with the face of the flange 15. The seam 21 of the pipe 20 registers with the internal longitudinal groove 19 in the coupling-sleeve 14, thus rendering any rotary motion of said sleeve impossible. After the pipe has been inserted within the coupling-sleeve 14 said pipe is forced into the internal annular groove 18 in any suitable manner, as shown in Fig. 2. This last operation insures a snug and close fit and answers the same purpose as if the pipe and coupling-sleeve were integral, guarding against any leakage and making the connection tight and substantial. The face of the flange 15 of the coupling-sleeve is then brought in contact with the face of the flange 4 of the reservoir member, and the annular projection 16 on said coupling-sleeve is made to register with the annular groove 5 in the reservoir member. The purposes of this construction are obvious, as it prevents leaking and insures a perfect and permanent alinement. As aforesaid, the flanges 4 and 15 are tapered, so that when they contact they form substantially a V. The coupling-ring is hollowed out, as described, to conform to the shape of the flanges. When said ring encircles the two flanges, the inner sides of the ring engage the tapering sides of the flanges, as shown in Fig. 2. The two members of the ring are then drawn together by means of the tightening pin or bolt, and the two flanges form inclined planes with the coupling-ring, and they are drawn tightly together and are securely held in that position, thus making a tight and secure coupling, easily detachable and simple in the extreme.

The central coupling in Figs. 1 and 2 is a duplication of that just described, with the exception that I employ a coupling-sleeve in place of the reservoir coupling member.

At the bottom of the cistern-pipe I use a coupling-sleeve 14, secured to the pipe as above described. The flange 23 of the funnel 22 has sufficient diameter to allow the flange 15 of the coupling-sleeve 14 to be inserted on the inside of prongs 24, the annular projection 16 on the flange 15 registering with the annular groove 5 in the flange 23. The prongs are then bent over the tapering side of said flange 15, thus making a substantial, permanent, and exceedingly simple connection.

In Fig. 3 I show my invention as applied to steam-pipes. The coupling ring and sleeves are the same as described, except I dispense with the internal grooves in said sleeves and instead provide the same with female threads and the pipes with male threads.

In Fig. 4 I show my invention as applied to hose-pipes. The coupling ring and sleeves are the same as described, except I provide said sleeves with external annular flanges or corrugations for obvious purposes.

Having thus specifically set forth the mode of operation of my invention, I do not wish to be understood as limiting myself to the exact construction herein set forth, as various slight changes might be made therein by those skilled in the art without departing from the spirit and scope of my invention, and I consider myself entitled to all such changes and modifications, and

What I claim as new, and desire to secure by Letters Patent of the United States, is—

1. In a pipe-coupling the combination with the pipe, of coupling-sleeves provided with internal annular grooves therein, an internal longitudinal groove therein, flanges on said sleeve, and a coupling-ring, substantially as described.

2. In a pipe-coupling the combination with the coupling-ring, having substantially a V-shaped hollow on the inside thereof, coupling-sleeves, flanges thereon forming substantially a V, an annular groove and an annular projection on said flanges, an annular depression in said flanges, substantially as and for the purposes set forth.

3. In a pipe-coupling a coupling-sleeve having a flange thereon, an annular projection on said flange, said flange having an annular depression therein, said sleeve having an internal annular groove, and an internal longitudinal groove substantially as and for the purposes set forth.

4. In a pipe-coupling, a coupling-sleeve having a flange thereon, said flange having an annular groove, and an annular depression therein, said sleeve having an internal annular groove and an internal longitudinal groove substantially as shown and described.

5. In a pipe-coupling the combination with the coupling-sleeve as described of a pipe turned over into an annular depression in said sleeve and forced into an annular groove in said sleeve, substantially as described.

6. In a pipe-coupling the combination with the coupling-sleeve, a flange thereon, an annular projection on said flange, with a funnel, a flange, having an annular groove therein, a series of prongs extending therefrom, substantially as described.

7. In a pipe-coupling for a cistern the combination with the reservoir of a coupling member secured thereto a flange on said member, said flange having an annular groove therein, a coupling-sleeve, having an internal annular groove and an internal longitudinal groove, a flange on said sleeve having an annular depression therein, an annular projection thereon, a coupling-ring, a pipe, a coupling-sleeve at the end thereof and a funnel, substantially as shown and described.

8. In a pipe-coupling the combination of coupling members, flanges on said members, the pipe, said flanges having annular depressions and an internal longitudinal groove to receive said pipe and a coupling-ring, substantially as described.

In testimony whereof I affix my signature in presence of two witnesses.

THEODORE AVERBECK.

Witnesses:
W. C. WILLIAMS,
ED. PIELAGE.